July 8, 1941.                A. H. KING                2,248,240
                       VARIABLE RATIO GEAR
              Filed Feb. 21, 1940            2 Sheets-Sheet 1
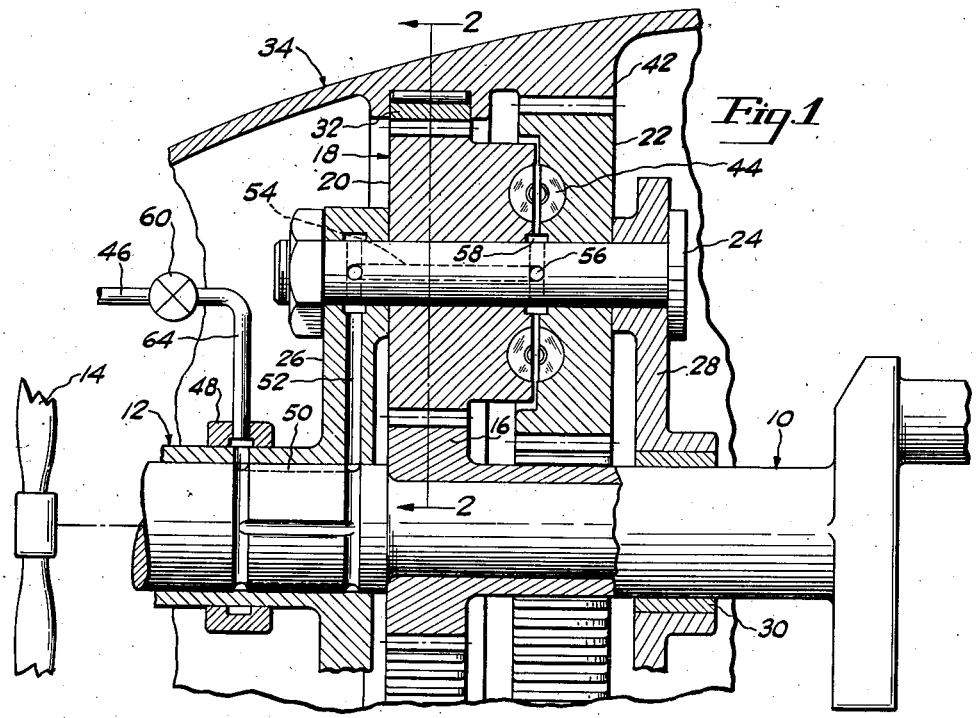
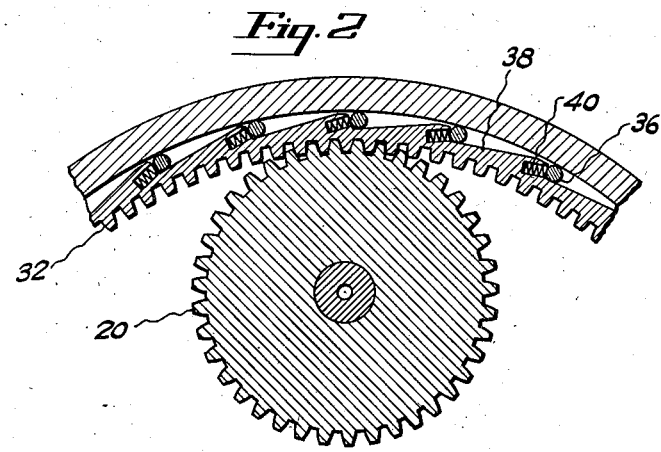
INVENTOR
*Alexander H. King.*
BY *Harris G. Luther*
ATTORNEY July 8, 1941.  A. H. KING  2,248,240
VARIABLE RATIO GEAR
Filed Feb. 21, 1940  2 Sheets-Sheet 2
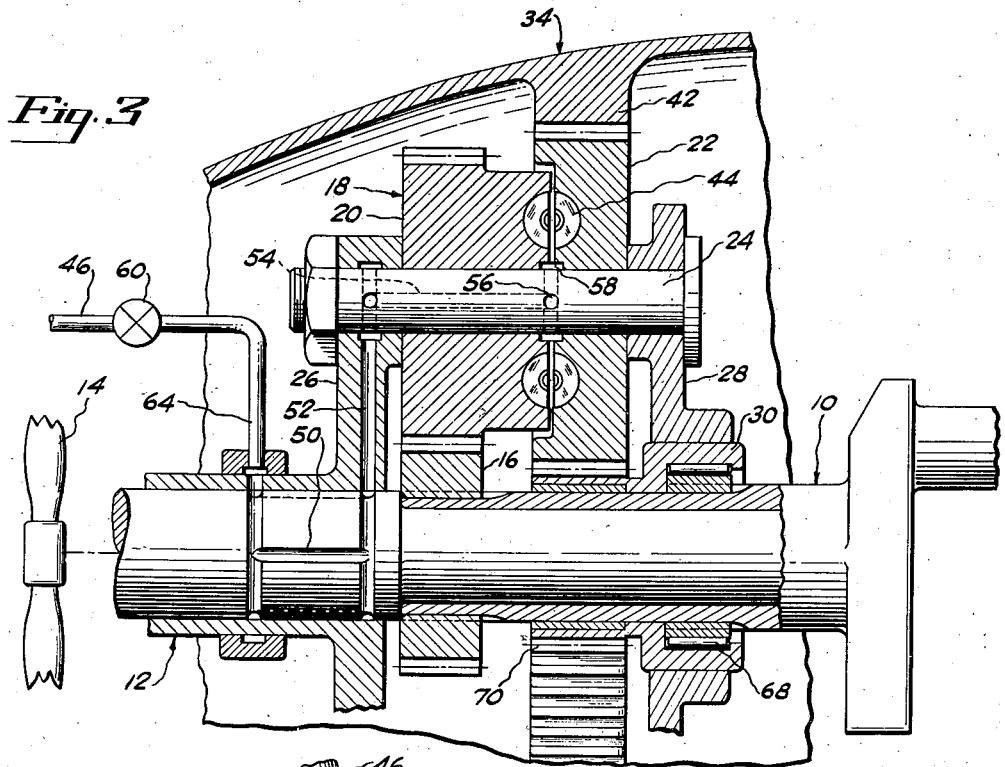
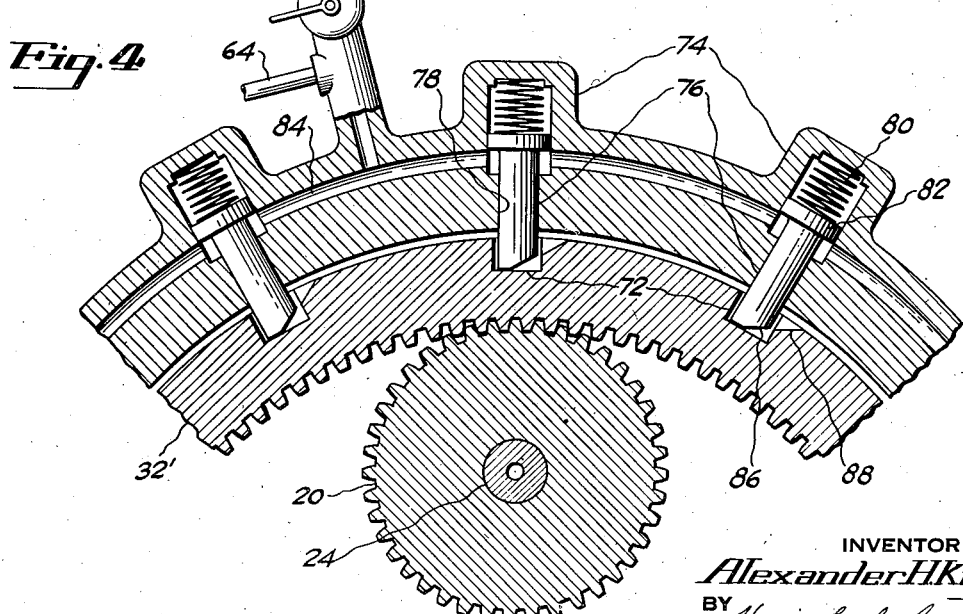
INVENTOR
Alexander H. King
BY
Harris G. Luther
ATTORNEY Patented July 8, 1941

2,248,240

UNITED STATES PATENT OFFICE 2,248,240

VARIABLE RATIO GEAR

Alexander H. King, West Hartford, Conn., assignor to United Aircraft Corporation, East Hartford, Conn., a corporation of Delaware Application February 21, 1940, Serial No. 320,031

7 Claims. (Cl. 74—294)

This invention relates to improvements in change speed gear drives and has particular reference to an improved multiple-speed planetary gear arrangement.

An object of the invention resides in the provision, in a change speed gear drive of the character indicated, of means for quickly and smoothly changing from one speed to another.

A somewhat more specific object resides in the provision, in a planetary multiple-speed gear drive of the character indicated, of hydraulic means for changing the drive from one gear ratio to a different ratio.

Other objects and advantages will be more particularly pointed out hereinafter or will become apparent as the description proceeds.

In the accompanying drawings, in which like reference numerals are used to designate similar parts throughout, there is illustrated in three somewhat different forms a suitable mechanical embodiment for the purpose of disclosing the invention. The drawings, however, are for purpose of illustration only and are not to be taken as limiting or restricting the invention as it will be apparent to those skilled in the art that various changes in the illustrated construction may be resorted to without in any way exceeding the scope of the invention.

In the drawings,

Fig. 1 is a longitudinal sectional view through a fragmentary portion of a gear drive constructed according to the invention.

Fig. 2 is a sectional view on the line 2—2 of Fig. 1.

Fig. 3 is a longitudinal sectional view similar to Fig. 1 through a somewhat modified form of gear drive constructed according to the invention, and Fig. 4 is a transverse sectional view similar to Fig. 2 showing a further modified form of gear drive constructed according to the invention.

Referring to the drawings in detail, the numeral 10 generally indicates a drive shaft, such as an engine crankshaft, and the numeral 12 generally indicates a driven shaft, which may be a propeller shaft for an aircraft or boat, or a drive shaft for some other purpose. The numeral 14 generally indicates an aeronautical propeller which may be carried upon and driven by the shaft 12.

The drive shaft 10 is provided with a drive gear 16 which meshes with a plurality of planet gears, one of which is generally indicated at 18. Each of these planet gears comprises two coaxial parts, 20 and 22, rotatably mounted on a common axle 24 carried by a cage integral with or fixed upon the driven shaft 12. In the construction illustrated, one part 26 of the cage has been shown as formed integrally with the driven shaft 12 and another portion 28, rigidly secured to the portion 26 by the axles 24, is rotatable upon the drive shaft 10 and supported thereon by means of a suitable bearing 30.

The gear elements 20 and 22 are of different diameters, the gear 22 being somewhat larger than the gear 20 in the illustrated construction. The gear 20 meshes with an internally toothed reaction gear 32 rotatably mounted in a fixed member such as the engine nosepiece, generally indicated at 34, and held against rotation by a one-way brake which may conveniently comprise a plurality of rollers 36 disposed in respective cam slots 38 provided in the periphery of the ring gear 32 and urged into wedging relation between the cam slots in the ring gear and the surrounding surface of the member 34 by suitable means, such as the springs 40. The gear element 22 meshes with an internally toothed reaction gear 42 rigidly secured to or formed integrally with the fixed element 34. The gear 42 is somewhat larger in diameter than the gear 32 so that the gear elements 20 and 22 mesh correctly with the respective reaction gears 32 and 42.

When the drive shaft 10 rotates, the drive gear 16 drives the gear element 20 and causes it to rotate about the interior of the ring gear 32 carrying with it the cage 26 which will in turn rotate the driven shaft 12 at a speed less than the speed of rotation of the drive shaft 10.

A fluid clutch 44, preferably of the "Föttinger" or "Vulcan" type, well known to the art, is incorporated between the gear elements 20 and 22, a similar clutch being preferably incorporated between each pair of gear elements of the planetary drive. These clutches are supplied with hydraulic fluid from a fluid pressure source through a conduit 46 which may lead to an oil collector ring 48 mounted on the driven shaft 12 and through suitable channels 50, 52 and 54 in the interior of the drive shaft, the cage 26, and the axle 24 respectively, to the clutch 44, the fluid entering the clutch from the axle through suitable ports 56 in the axle and an annular channel 58 provided in the gears 20 and 22 surrounding the axle and in line with the clutch, the arrangement being such that all of the clutches will be simultaneously supplied with hydraulic fluid when it is desired to change the drive from the gear element 20 to the gear element 22. The fluid supply to the clutches may be controlled by a valve 60 disposed between the fluid supply line 46 and a conduit 64 leading to the transfer ring 48.

Assuming that the shaft 10 is rotating and driving the shaft 12 at the lower speed through the gear element 20 and that it is desired to change the drive to drive at a higher speed through the gear element 22, the valve 60 will be operated to connect the conduit 64 to the pressure conduit 46. Fluid will then flow through the channels 50, 52 and 54 the ports 56 to each clutch 44 and, upon filling the clutches, will clutch the respective gear elements 20 and 22 together against free relative rotation. The drive will then be from the drive gear 16 on the drive shaft through the gear element 20 and clutch 44 to the gear element 22 causing the gear element 22 to rotate around the interior of the ring gear 42. As the ratio of the diameters of the gears 22 and 20 is greater than the ratio of the diameters of the ring gears 42 and 32 the cage 26 will be carried around at an increased speed and the ring gear 32 will also be carried around by the gear element 20 overrunning the one-way brake which includes the elements 36, 38 and 40.

When it is desired to shift back to the low speed drive, the valve 60 will be operated to disconnect the conduit 64 from the supply line 46 whereupon each clutch 44 will empty and permit the respective gear element 22 to rotate relative to the associated gear element 20. As the driving connection between the gear elements 20 and 22 is released the drive through the gear elements 20 and the ring gear 32 will be resumed and the one-way brake will again take up the reaction load.

In the modification shown in Fig. 3, the ring gear 32 and one-way brake associated therewith is omitted and a one-way clutch 68 is provided between the bearing element 30 of the cage portion 28 and the drive shaft 10, and a gear 70 carried by the element 30 meshes with the planetary gear elements 22. Otherwise the construction is substantially the same as that described above in connection with Figs. 1 and 2.

In the operation of this arrangement, with the valve 60 closed and the clutch 44 empty the one-way clutch 68 will be engaged and the drive will be from the drive shaft 10 through the gear 70 to the gears 22 which gears will rotate around the ring gear 42 and carry the cage 26 with them and thereby rotate the driven shaft 12. When the valve 60 is opened and oil admitted to the fluid clutch 44 and drive will then be through the gear 16 to the gear element 20 and from the gear element 20 through the element 22 to the ring gear 44 providing a higher speed gear ratio between the drive shaft 10 and driven shaft 12. Under these circumstances the gear 70 will be driven by the gear element 22 and the one-way clutch 68 will permit the member 30 to rotate at a speed higher than the speed of the drive shaft 10.

In the arrangement shown in Fig. 4 the gear arrangement is substantially the same as that illustrated in Figs. 1 and 2 and described above, a somewhat modified form of one-way brake being shown. It is to be understood, however, that the invention is not limited to either specific form of free-wheeling or one-way brake herein illustrated.

In the form of the invention illustrated in Fig. 4 the reaction ring gear 32' for the gear element 20 is rotatably mounted in the nose piece 34 and is provided in its periphery with a plurality of wells or recesses 72. The portion of the nose piece 34 surrounding this ring member is provided with a plurality of annularly spaced cylinders 74 within which are reciprocable plungers 76 extending through apertures 78 in the inner portion of the fixed member and into the wells 72. Springs 80, disposed one in each cylinder, resiliently urge the plungers inwardly and into the corresponding recesses in the ring gear 32'. The interiors of the cylinders 74 are somewhat larger than the apertures 78 and the plungers are provided with enlarged head portions 82 which fit the interiors of the cylinders. While only three plungers have been shown in the illustration it is to be understood that as many may be used as may be necessary or desired.

A branch conduit 84 leads from the valve 60 and connects with the interiors of all of the cylinders 74 at the inner ends thereof beneath the heads 82 so that when hydraulic fluid is applied to the clutches 44 it will also be simultaneously applied to the plungers 76 to move the plungers out of the recesses 72 and permit the ring gear 32' to rotate freely during the time the drive is through the gear elements 22.

The inner ends of the plungers are provided with beveled portions, as indicated at 86, and the recesses 72 are provided with beveled edge portions 88 which will cooperate with the beveled end portions 86 of the plungers to move the plungers out of the recesses and prevent damage to the mechanism in the event the pressure fluid fails to raise any plunger entirely clear of the ring gear. The device would, therefore, operate without injury if the effect of the fluid pressure on the plungers were omitted but the fluid pressure acts on the plungers to move them clear of the ring gear and prevent ratcheting and noise and the consequent vibration and drag that would be present if the beveled portions alone were depended upon to provide the free-wheeling action.

While a particular mechanical construction and two slightly modified forms thereof have been hereinabove described and illustrated in the accompanying drawings for the purpose of disclosing the invention, it is to be understood that the invention is not limited to the particular construction so illustrated and described, but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In a change speed planetary gear drive, a driving member, a driven member, a drive gear on said driving member, a cage on said driven member, a plurality of pinion gears carried by said cage and meshing with said drive gear, a reaction gear meshing with said pinion gears, a gear element concentric with each pinion gear, a second reaction gear meshing with said gear elements, said gear elements and said second reaction gear providing a different gear ratio than said pinion gears and said first mentioned reaction gear, a fluid clutch between each pinion gear and the respective concentric gear elements, means for supplying hydraulic fluid to said clutches, and means restraining said first mentioned reaction gear against rotation in one direction while permitting free rotation thereof in the opposite direction.

2. In a change speed planetary gear including a driving member, a driven member, a drive gear on said driving member, a cage on said driven member, a pinion gear carried by said cage and meshing with said drive gear, and a reaction gear meshing with said pinion gear, a gear element larger than said pinion gear and coaxial therewith carried by said cage, a fluid clutch between said pinion gear and said gear elements, means for supplying hydraulic fluid to said clutch, means for controlling said fluid supply to render said clutch operative or inoperative, a reaction gear meshing with said gear elements, and a one-way brake between said first-mentioned reaction gear and a fixed support therefor for restraining said first-mentioned reaction gear against rotation in one direction while permitting free overrun thereof in the opposite direction.

3. In a change speed planetary gear drive including a driving member, a driven member, a drive gear on said driving member, a cage on said driven member, a pinion gear carried by said cage and meshing with said drive gear, and a reaction gear meshing with said pinion gear, a gear element larger than said pinion gear and coaxial therewith carried by said cage, a second reaction gear meshing with said gear elements, a fluid clutch between said pinion gear and said gear elements, means for supplying hydraulic fluid to said clutch, means for controlling said fluid supply to render said clutch operative or inoperative, and means for restraining said first-mentioned reaction gear against rotation releasable upon application of hydraulic fluid to said clutch to permit free rotation of said first-mentioned reaction gear whenever said clutch is operative.

4. In a change speed planetary gear drive including a driving member, a driven member, a drive gear on said driving member, a cage on said driven member, and an axle carried by said cage, a pair of coaxial planetary gears of different diameters on said axle, a pair of coaxial ring gears of different diameters meshing with said planetary gears, a fluid clutch between said planetary gears, means for supplying hydraulic fluid under pressure to said clutch, means for controlling said fluid supply to render said clutch operative or inoperative, and means for restraining the smaller of said reaction gears against rotation releasable by the pressure of said hydraulic fluid supplied to said clutch to permit free rotation of said smaller reaction gear whenever said clutch is operative.

5. In a change speed planetary gear drive including a driving member, a driven member, a drive gear on said driving member, a cage on said driven member, and an axle carried by said cage, a pair of coaxial planetary gears of different diameters on said axle, a pair of coaxial ring gears of different diameters meshing with said planetary gears, a fluid clutch between said planetary gears, means for supplying hydraulic fluid under pressure to said clutch, means for controlling said fluid supply to render said clutch operative or inoperative, and means for restraining the smaller of said reaction gears against rotation releasable by the pressure of said hydraulic fluid supplied to said clutch to permit free rotation of said smaller reaction gear whenever said clutch is operative said gear restraining means including beveled portions which render it automatically releasable in the event said clutch should become operative without said restraining means being released by said fluid pressure.

6. In a change speed planetary gear drive including a driving member, a driven member, a cage drivingly associated with said driven member, at least one compound planetary gear having two concentric portions of different size carried by said cage, a gear fixed on said driving member meshing with the smaller part of said planetary gear, a second gear on said driving member meshing with the larger part of said planetary gear, a one-way drive clutch between said second gear and said driving member, a fixed ring gear concentric with said driving member meshing with the larger part of said compound planetary gear, a fluid clutch between the parts of said planetary gear, and manually controllable means for supplying fluid to said clutch.

7. In a change speed planetary gear drive including a driving member, a driven member, two drive gears on said driving member, a cage on said driven member, a two part pinion gear carried by said cage so that the two parts thereof mesh respectively with said two driven member carried gears and a reaction gear meshing with one part of said planetary gear, a one-way clutch between the driving member and the drive gear meshing with said one part of said planetary gear, a fluid clutch between the two parts of said planetary gear, and a manually controlled fluid supply for said clutch.

ALEXANDER H. KING.